(12) United States Patent  (10) Patent No.: US 7,636,472 B2
Maruoka  (45) Date of Patent: Dec. 22, 2009

(54) IMAGE QUALITY CORRECTION APPARATUS AND IMAGE QUALITY CORRECTION METHOD

(75) Inventor: Kazutaka Maruoka, Saijo (JP)

(73) Assignee: Panasonic Corporation, Osaka (JP)

( * ) Notice: Subject to any disclaimer, the term of this patent is extended or adjusted under 35 U.S.C. 154(b) by 1166 days.

(21) Appl. No.: 10/936,682

(22) Filed: Sep. 9, 2004

(65) Prior Publication Data

US 2005/0058341 A1    Mar. 17, 2005

(30) Foreign Application Priority Data

Sep. 11, 2003    (JP) ............................. 2003-320086

(51) Int. Cl.
*G06K 9/00* (2006.01)
*G06K 9/40* (2006.01)
(52) U.S. Cl. ..................... 382/167; 382/168; 382/274
(58) Field of Classification Search ................. 382/167
See application file for complete search history.

(56) References Cited

U.S. PATENT DOCUMENTS 5,828,780 A * 10/1998 Suzuki et al. ............... 382/167
7,199,840 B2    4/2007 Shiota

FOREIGN PATENT DOCUMENTS

| CN | 1284233 | 2/2001 |
|---|---|---|
| CN | 1406056 | 3/2003 |
| EP | 1 051 025 | 11/2000 |
| EP | 1051025 A1 * | 11/2000 |
| JP | 2001-180642 | 7/2001 |
| JP | 2002-369003 | 12/2002 |
| JP | 2003-069825 | 3/2003 |
| KR | 2001-0034326 | 4/2001 |
| WO | 99/38319 | 7/1999 |

* cited by examiner

*Primary Examiner*—Matthew C. Bella
*Assistant Examiner*—John W Lee
(74) *Attorney, Agent, or Firm*—Wenderoth, Lind & Ponack, L.L.P.

(57) ABSTRACT

A count judgment unit judges whether or not a luminous value and color-difference values calculated by a luminous color-difference calculation unit are those of a pixel as a component of a character area, and outputs only luminous values of pixels other than pixels as components of the character area, to a luminous histogram formation unit. Then, a correction amount calculation unit and an image quality correction unit perform correction of image quality of input image data on the basis of the luminous histogram that is formed by the luminous histogram formation unit using the luminous values outputted from the count judgment unit. Therefore, even when information that adversely affects image quality correction, such as characters, is mixed in the input image, appropriate correction can be performed on only the image area to be corrected.

9 Claims, 9 Drawing Sheets

IMAGE QUALITY CORRECTION APPARATUS AND IMAGE QUALITY CORRECTION METHOD

FIELD OF THE INVENTION

The present invention relates to an apparatus and a method for correcting image quality and, more particularly, to an apparatus and method for automatically correcting gradation of an input image in a digital image processing apparatus.

BACKGROUND OF THE INVENTION

Conventionally, as a technique for correcting an image, a method disclosed in Japanese Published Patent Application No. 2002-172423 (Pages 14~16, FIGS. 1~4) has been generally known. This method includes calculating luminous values of pixels of an input image, creating a luminous histogram illustrating the total sum of pixels having the same luminous value, and subjecting all of the pixels to a correction process that optimizes the shape of the created luminous histogram.

The conventional method will be described with reference to FIG. 15.

FIG. 15 is a block diagram illustrating a conventional image quality correction apparatus.

As shown in FIG. 15, the conventional image quality correction apparatus comprises an image pickup element 1401, an A/D converter 1402, a luminous signal calculation circuit 1403, a luminous histogram formation circuit (luminous distribution formation circuit) 1404, a correction amount calculation circuit 1405, and an image quality correction circuit (image signal correction circuit) 1406. In the image quality correction apparatus, the correction amount calculation circuit 1405 comprises a barycenter calculation circuit 1407, a distribution range calculation circuit 1408, a target value storage circuit 1409, and a correction table formation circuit 1410.

The luminous signal calculation circuit 1403 calculates luminous values of image data outputted from the A/D converter 1402, and the luminous histogram formation circuit 1404 forms a luminous histogram of the input image by using the luminous values calculated by the luminous signal calculation circuit 1403.

Further, the barycenter calculation circuit 1407 calculates a barycenter position of a low luminous part from the luminous histogram formed by the luminous histogram formation circuit 1404, and the distribution range calculation circuit 1408 calculates the maximum value and the minimum value on the input luminous level axis from the luminous histogram formed by the luminous histogram formation circuit 1404.

The target value storage circuit 1409 holds a target value of luminous correction, and the correction table formation circuit 1410 forms a correction table in which the luminous distribution is enlarged and, simultaneously, the barycenter position matches the target value stored in the target value storage circuit 1409, on the basis of the barycenter position which is calculated by the barycenter calculation circuit 1407, and the maximum and minimum values on the input luminous level which are calculated by the distribution range calculation circuit 1408.

The image quality correction circuit 1406 performs gradation correction with reference to the correction table formed by the correction table formation circuit 1410.

Next, the operation of the conventional image quality correction apparatus will be described.

An image signal outputted from the image pickup element 1401 is converted into image data by the A/D converter 1402, and the image data is output to the luminous signal calculation circuit 1403 and to the image quality correction circuit 1406.

The image data outputted from the A/D converter 1402 is input to the luminous signal calculation circuit 1403, and the luminous values of the respective pixels constituting the image data are calculated, and thereafter, a luminous histogram is formed by the luminous histogram formation circuit 1404.

The luminous histogram is output to the barycenter calculation circuit 1407 and to the distribution range calculation circuit 1408. On the basis of luminous histogram of the input image, the barycenter calculation circuit 1407 calculates the barycenter position of the low luminous part, and the distribution range calculation circuit 1408 calculates the maximum and minimum values on the input luminous level axis.

Then, the barycenter position of the low luminous part calculated by the barycenter calculation circuit 1407, and the maximum and minimum values on the input luminous level axis calculated by the distribution range calculation circuit 1408 are input to the correction table formation circuit 1410, and a correction table is formed so that the luminous distribution is enlarged and, simultaneously, the barycenter position matches the luminous correction target value that is stored in the target value storage circuit 1409.

Then, the image data outputted from the A/D converter 1402 and the correction table outputted from the correction table formation circuit 1410 are input to the image quality correction circuit 1406, whereby the image data is subjected to gradation correction on the basis of the correction table, thereby automatically carrying out optimum gradation correction for the input image.

In the conventional construction, however, when a character area, such as subtitles of a movie, exists in an input image, the luminous values of the characters are undesirably counted during formation of the luminous histogram, although only the image data in the image area excluding the character area should be corrected. Therefore, a luminous histogram corresponding to only the image area of the input image cannot be formed, and an accurate amount of correction cannot be calculated. As a result, optimum correction for the input image cannot be carried out.

Further, in an apparatus capable of selecting presence or absence of subtitles, such as a DVD player, since the shape of the luminous histogram varies depending on presence/absence of subtitles, a difference in image qualities might occur between an image having subtitles and an image having no subtitles even in the same scene.

Furthermore, there are many cases where the character area included in the input image employs a luminous value which is significantly different from that of the image area so as to clarify the characters, and the luminous value appears as an outstanding shape in the luminous histogram. Therefore, when the amount of correction is calculated on the basis of the luminous histogram, erroneous correction of image quality might be carried out, resulting in degradation in image quality due to the correction.

SUMMARY OF THE INVENTION

The present invention is made to solve the above-described problems and has for its object to provide an apparatus and a method for correcting image quality, which is able to carry out optimum correction even when a character area or the like exists in an input image, without being affected by the character area.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an image quality correction apparatus comprises: an image data selecting unit for, when inputted image data (hereinafter referred to as input image data) includes image data which causes degradation in image quality (hereinafter referred to as degradation factor data) when subjecting the input image data to correction of image quality, removing the degradation factor data from the input image data; a luminous histogram formation unit for forming a luminous histogram of image data that is outputted from the image data selecting unit; a correction amount calculation unit for calculating an amount of correction on the basis of the luminous histogram formed by the luminous histogram formation unit; and an image quality correction unit for correcting the input image data on the basis of the amount of correction that is calculated by the correction amount calculation unit. Therefore, even when degradation factor data that adversely affects correction of image quality is mixed into the input image data, a corrected image can be obtained by performing appropriate correction for the input image data without being affected by the degradation factor data.

According to a second aspect of the present invention, in the image quality correction apparatus according to the first aspect, the degradation factor data are pixel data that constitute a character area included in the input image data; the image data selecting unit comprises a luminous color-difference calculation unit for calculating, from the input image data, a luminous value and color-difference values for each of pixel data that constitute the input image data, a specified pixel information storage unit for holding pixel information of pixels that constitute the character area, and a count judgement unit for judging whether a target pixel having the luminous value and the color-difference values outputted from the luminous color-difference calculation unit is a component of the character area or not, on the basis of the luminous values and the color-difference values which are obtained from the pixel information stored in the specified pixel information storage unit, and outputting the luminous value of the target pixel only when the target pixel is not a component of the character area; and the luminous histogram formation unit forms a luminous histogram of the image data on the basis of the luminous value outputted from the count judgement unit. Therefore, even when information of a character area that adversely affects correction of image quality is mixed into the input image data, a corrected image can be obtained by performing appropriate correction for the input image data without being affected by the information of the character area.

According to a third aspect of the present invention, in the image quality correction apparatus according to the second aspect, the count judgement unit judges that the target pixel is a component of the character area when the luminous value and the color-difference values obtained from the specified pixel information storage unit match the luminous value and the color-difference values of the target pixel. Therefore, even when information of a character area that adversely affects correction of image quality is mixed into the input image data, a corrected image can be obtained by performing appropriate correction for the input image data without being affected by the information of the character area.

According to a fourth aspect of the present invention, in the image quality correction apparatus according to the second aspect, the count judgement unit gives a predetermined range to each of the luminous value and the color-difference values which are obtained from the specified pixel information storage unit, and judges that the target pixel is a component of the character area when the luminous value and the color-difference values of the target pixel which are outputted from the luminous color-difference calculation unit are within the ranges of the luminous value and the color-difference values, respectively. Therefore, even when the image appears blurred or the color of the image appears bleeding due to image compression or the like, the luminous values of the character area can be flexibly eliminated from the luminous histogram.

According to a fifth aspect of the present invention, in the image quality correction apparatus according to the second aspect, the specified pixel information storage unit holds a plurality of pixel information of the pixels which constitute the character area. Therefore, even when plural character areas having luminous values and color-difference values are included in the input image, the plural character areas can be discriminated from each other. Further, since a plurality of image information which are frequently used are stored, updation of image information for every input image is not necessary, thereby saving time and effort for resetting the image information.

According to a sixth aspect of the present invention, the image quality correction apparatus according to the second aspect further includes a total frequency judgement unit for counting the number of pixels having the luminous value outputted from the count judgement unit, and judging whether or not the ratio of the number of the counted pixels to the total number of pixels of the input image data is equal to or lower than a predetermined threshold value, and performing no correction of image quality for the input image when the ratio is equal to or lower than the threshold value. Therefore, it is possible to dispense with correction of image quality for an input image which does not need correction of image quality, such as an illustration or the like using a few colors.

According to a seventh aspect of the present invention, in the image quality correction apparatus according to the first aspect, the degradation factor data are pixel data which constitute a character area and are included in the input image data; the image data selecting unit comprises a luminous color-difference calculation unit for calculating a luminous value and color-difference values for each pixel, from the input image data, a projecting level detection unit for detecting a locally projecting gradation level from the luminous histogram that is formed using all pixels of the input image data, a pixel information setting unit for detecting color-difference values whose frequencies are equal to or higher than a predetermined value, from the color-difference values of the pixels having the luminous value of the projecting level which is detected by the projecting level detection unit, and setting the detected color-difference values and the luminous value of the projecting level, as pixel information of pixels which constitute the character area, and a count judgement unit for judging whether a target pixel having the luminous value and the color-difference values outputted from the luminous color-difference calculation unit is a component of the character area or not, on the basis of the luminous values and the color-difference values which are obtained from the pixel information that is set by the pixel information setting unit, and outputting the luminous value of the target pixel only when the target pixel is not a component of the character area; the luminous histogram formation unit forms a luminous histogram using the luminous values of all pixels of the input image data, and a luminous histogram using the luminous values of pixels outputted from the count judgement unit; and the correction amount calculation unit calculates an output of correction on the basis of the luminous histogram that is formed by using the luminous values of pixels outputted from the count judgement unit. Therefore, it is possible to automatically specify the pixels which are components of the character area and are mixed into the image data. Further, even when information of the character area that adversely affects correction of image quality is mixed into the input image data, corrected image data can be obtained by performing appropriate correction for the input image data without being affected by the information of the character area.

According to an eighth aspect of the present invention, in the image quality correction apparatus according to the seventh aspect, the count judgement unit judges that the target pixel is a component of the character area when the luminous value and the color-difference values which are obtained from the pixel information match the luminous value and the color-difference values of the target pixel which are outputted from the luminous color-difference calculation unit. Therefore, even when information of a character area that adversely affects correction of image quality is mixed into the input image data, a corrected image can be obtained by performing appropriate correction for the input image data without being affected by the information of the character area.

According to a ninth aspect of the present invention, in the image quality correction apparatus according to the seventh aspect, the pixel information setting unit comprises a color-difference histogram plane formation unit for forming a color-difference histogram plane that shows distribution and frequencies of color-difference values, on the basis of the color-difference values of pixels having the luminous value of the projecting level which is detected by the projecting level detection unit; and a setting unit for setting the luminous value of the projecting level and the color-difference values detected by the color-difference value detection unit, as pixel information of pixels which constitute the character area. Therefore, it is possible to automatically specify the pixels which are components of the character area and are mixed into the image data.

According to a tenth aspect of the present invention, in the image quality correction apparatus according to the ninth aspect, the color-difference value detection unit divides the color-difference histogram plane at predetermined intervals into plural areas, and judges whether or not a representative value that is calculated from the frequencies of color-difference values in each area is equal to or larger than a predetermined threshold value, thereby to detect the color-difference values within the area having the representative value that is equal to or larger than the threshold value. Therefore, even when the image appears blurred or the color of the image appears bleeding due to image compression or the like, the color-difference values of the character area can be flexibly calculated.

According to an eleventh aspect of the present invention, in the image quality correction apparatus according to the ninth aspect, when areas having color-difference values whose frequencies are equal to or higher than the predetermined threshold value are continuous on the color-difference histogram plane, the color-difference value detection unit judges whether or not the ratio of the area of the continuous areas on the color-difference histogram plane to the whole distribution area of color-difference values is equal to or higher than a predetermined threshold value; and when the ratio is equal to or higher than the threshold value, the color-difference value detection unit does not detect the color-difference values within the continuous areas, as color-difference values of pixels which constitute the character area. Therefore, an image of a uniform color having gradations, such as sky, is prevented from being erroneously detected as pixels which constitute the character area.

According to a twelfth aspect of the present invention, in the image quality correction apparatus according to the ninth aspect, the setting unit judges whether the luminous value of the projecting level or the color-difference values detected by the color-difference value detection unit is/are apart by a predetermined threshold value or more from predetermined reference values which are set for the luminous value and the color-difference values, respectively; and only when either of the luminous value and the color-difference values is apart from the predetermined reference value, the setting unit sets the luminous value and the color-difference values as pixel information of pixels which constitute the character area. Therefore, it is possible to avoid false detection of pixels which do not constitute the character area, thereby increasing the accuracy of the pixel information setting unit for setting pixels which constitute the character area.

According to a thirteenth aspect of the present invention, the image quality correction apparatus according to the seventh aspect further include a specified pixel information storage unit for holding the pixel information of the pixels which constitute the character area; wherein the count judgement unit judges whether the target pixel having the luminous value and the color-difference values outputted from the luminous color-difference calculation unit is a component of the character area or not, on the basis of the luminous values and the color-difference values which are obtained from the pixel information that is set by the pixel information setting unit, and the luminous value and the color-difference values which are obtained from the pixel information stored in the specified pixel information storage unit, and outputs the luminous value of the target pixel only when the target pixel is not a component of the character area. Therefore, at least the pixels which have already been known as pixels constituting the character area are judged as pixels constituting the character area by the count judgement unit, thereby avoiding a reduction in accuracy of image correction, which is caused by omission of pixels in setting the pixels constituting the character area by the pixel information setting unit.

According to a fourteenth aspect of the present invention, the image quality correction apparatus according to the seventh aspect further includes a total frequency judgement unit for counting the number of pixels having the luminous values outputted from the count judgement unit, and judging whether or not the ratio of the number of the counted pixels to the total number of pixels of the input image data is equal to or lower than a predetermined threshold value, and performing no correction of image quality for the input image when the ratio is equal to or lower than the predetermined value. Therefore, it is possible to dispense with correction of image quality for an input image that does not need correction of image quality, such as illustration or the like using only a few colors.

According to a fifteenth aspect of the present invention, an image quality correction method comprises: an image data selecting step of, when input image data includes degradation factor data which causes degradation in image quality when correcting the image quality of the input image data, removing the degradation factor data from the input image data; a luminous histogram formation step of forming a luminous histogram of image data that is selected in the image data selecting step; a correction amount calculation step of calculating an amount of correction on the basis of the luminous histogram formed in the luminous histogram formation step; and an image quality correction step of correcting the input image data on the basis of the amount of correction that is calculated in the correction amount calculation step. Therefore, even when degradation factor data that adversely affects correction of image quality is mixed into the input image data, a corrected image can be obtained by performing appropriate correction for the input image data without being affected by the degradation factor data.

According to a sixteenth aspect of the present invention, in the image quality correction method according to the fifteenth aspect, the degradation factor data is pixel data which constitute a character area and are included in the input image data; the image data selecting step comprises a luminous color-difference calculation step of calculating, from the input image data, a luminous value and color-difference values of each of pixel data that constitute the input image data, and a count judgement step of judging whether a target pixel having the luminous value and the color-difference values outputted from the luminous color-difference calculation step is a component of the character area or not, on the basis of luminous values and color-difference values which are obtained from pixel information stored in a specified pixel information storage unit which holds pixel information of pixels constituting the character area, and outputting the luminous value of the target pixel only when the target pixel is not a component of the character area; and the luminous histogram formation step forms a luminous histogram of the image data on the basis of the luminous value outputted from the count judgement step. Therefore, even when information of a character area that adversely affects correction of image quality is mixed into the input image data, a corrected image can be obtained by performing appropriate correction for the input image data without being affected by the information of the character area.

According to a seventeenth aspect of the present invention, in the image quality correction method according to the fifteenth aspect, the degradation factor data are pixel data which constitute a character area included in the input image data; the image data selecting step comprises a luminous color-difference calculation step of calculating a luminous value and color-difference values for each pixel, from the input image data, a projecting level detection step of detecting a locally projecting gradation level from the luminous histogram that is formed using all pixels of the input image data, a pixel information setting step of detecting color-difference values whose frequencies are equal to or higher than a predetermined value, from the color-difference values of the pixels having the luminous value of the projecting level which is detected in the projecting level detection step, and setting the detected color-difference values and the luminous value of the projecting level, as pixel information of pixels which constitute the character area, and a count judgement step of judging whether a target pixel having the luminous value and the color-difference values outputted from the luminous color-difference calculation step is a component of the character area or not, on the basis of the luminous values and the color-difference values which are obtained from the pixel information set in the pixel information setting step, and outputting the luminous value of the target pixel only when the target pixel is not a component of the character area; the luminous histogram formation step forms a luminous histogram using the luminous values of all pixels of the input image data, and a luminous histogram using the luminous values of pixels outputted from the count judgement step; and the correction amount calculation step calculates an output of correction on the basis of the luminous histogram that is formed by using the luminous values of pixels outputted from the count judgement step. Therefore, it is possible to automatically specify the pixels which are components of the character area and are mixed into the image data. Further, even when information of the character area that adversely affects correction of image quality is mixed into the input image data, corrected image data can be obtained by performing appropriate correction for the input image data without being affected by the information of the character area.

DETAILED DESCRIPTION OF THE PREFERRED EMBODIMENTS

Hereinafter, embodiments of the present invention will be described with reference to the drawings. However, the embodiments described below are merely examples, and the present invention is not restricted thereto.

Embodiment 1

Hereinafter, an image quality correction apparatus and an image quality correction method according to a first embodiment of the present invention will be described with reference to the drawings.

The image quality correction apparatus and method according to the first embodiment performs correction of image quality by using a luminous histogram corresponding to only an image area which is obtained by excluding a character area from input image data. The character area is an area of data which constitute characters and the like and are included in the input image, such as subtitles of a movie, and this data area appears as an outstanding shape in the luminous histogram.

Figure 1:
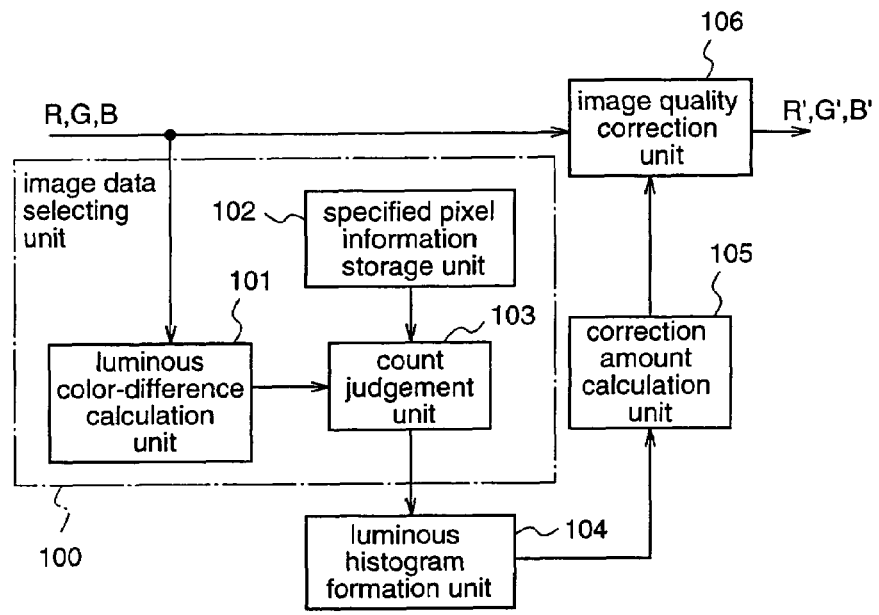
FIG. 1 is a block diagram illustrating the construction of an image quality correction apparatus according to a first embodiment of the present invention.

FIG. 1 is a block diagram illustrating an example of an image quality correction apparatus according to the first embodiment of the present invention.

With reference to FIG. 1, the image quality correction apparatus according to the first embodiment comprises a luminous color-difference calculation unit 101, a specified pixel information storage unit 102, a count judgement unit 103, a luminous histogram formation unit 104, a correction amount calculation unit 105, and an image quality correction unit 106.

The luminous color-difference calculation unit 101 calculates luminous values and color-difference values of the respective pixels from input image data R, G, and B, and outputs the calculated luminous values and color-difference values to the count judgement unit 103.

The specified pixel information storage unit 102 is a memory for holding pixel information of the pixels which constitute the character area (data area) that appears as an outstanding shape in a luminous histogram. In this first embodiment, the luminous values and color-difference values of the pixels which constitute the character area have previously been stored in the specified pixel information storage unit 102 as pixel information.

The count judgement unit 103 judges whether or not the luminous value and the color-difference value stored in the specified pixel information storage unit 102 match the luminous value and the color-difference value of a target pixel that is outputted from the luminous color-difference calculation unit 101. When there is a match, it is judged that the target pixel is a component of the character area, and the data of the target pixel is discarded. When there is no match, it is judged that the target pixel is not a component of the character area, and the luminous value of the target pixel is output to the luminous histogram formation unit 104.

An image data selecting unit 100 comprises the luminous color-difference calculation unit 101, the specified pixel information storage unit 102, and the count judgement unit 103. When the pixel data included in the character area is degradation factor data which causes degradation in image quality when subjecting the input image data to correction of image quality, the image data selecting unit 100 performs data selection so as to eliminate the pixel data in the character area from the input image data.

The luminous histogram formation unit 104 forms a luminous histogram from the luminous values outputted from the count judgement unit 103, and outputs the luminous histogram to the correction amount calculation unit 105.

The correction amount calculation unit 105 calculates the amount of correction by using the luminous histogram formed by the luminous histogram formation unit 104, and outputs the amount of correction to the image quality correction unit 106.

The image quality correction unit 106 corrects the input image data R, G, and B on the basis of the amount of correction calculated by the correction amount calculation unit 105 to generate image output data R', G', and B'.

Next, the operation of the image quality correction apparatus according to the first embodiment will be described.

Figure 2:
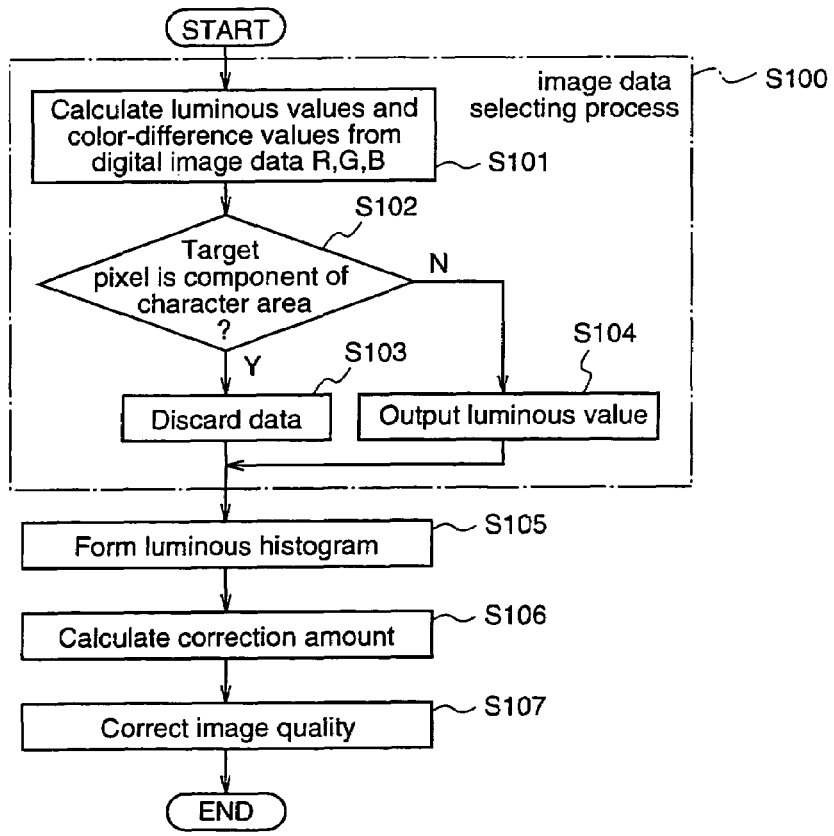
FIG. 2 is a flowchart for explaining an image quality correction method performed by the image quality correction apparatus according to the first embodiment.

FIG. 2 is a flowchart for explaining the image quality correction method that is performed by the image quality correction apparatus according to the first embodiment. It is assumed that each of the input image data R, G, and B has eight bits, although the present invention is not restricted thereto.

The flowchart shown in FIG. 2 comprises steps S101 to S107. To be specific, step S101 is a luminous color-difference calculation process, steps S102~S104 are count judgement processes, step S100 is an image data selecting process comprising steps S101~S104, step S105 is a luminous histogram formation process, step S106 is a correction amount calculation process, and step S107 is an image quality correction process.

Hereinafter, the respective steps will be described in detail.

(Step S101)

When the digital image data of R, G, and B are input to the image quality correction apparatus according to the present invention, initially the luminous color-difference calculation unit 101 calculates a luminous value and color-difference values of each pixel from the input image data R, G, and B.

The luminous value Y and the color-difference values Cr and Cb may be calculated by formulae (1)~(3) as follows.

$$Y = 0.299 \times R + 0.587 \times G + 0.114 \times B \quad (1)$$

$$Cr = R - Y \quad (2)$$

$$Cb = B - Y \quad (3)$$

However, formulae (1)~(3) are merely examples. The luminous value may be an average of R, G, and B, or the color-difference values Cr and Cb may be obtained by formulae (2) and (3) using the value of G as the luminous value Y.

(Step S102)

Next, the luminous value and the color-difference values calculated by the luminous color-difference calculation unit 101 are input to the count judgement unit 103, and the count judgement unit 103 judges whether the target pixel having the inputted luminous value and color-difference values is a component of the character area or not.

To be specific, the count judgement unit 103 receives the luminous value and the color-difference values of the target pixel, which are supplied from the luminous color-difference calculation unit 101, and judges whether or not the luminous value and the color-difference values of the inputted target pixel match the luminous value and the color-difference values of the pixel information stored in the specified pixel information storage unit 102.

At this time, in the count judgement unit 103, the pixel information stored in the specified pixel information storage unit 102 may have a predetermined range. For example, when the pixel information stored in the specified pixel information storage unit 102 is "luminous value Y=128, color difference value Cr=30, color-difference value Cb=50", the count judgment unit 103 judges that a pixel having luminous value Y=124~132, color-difference value Cr=26~34, and color-difference value Cb=46~54 (i.e., each value having a margin of ±4) is a component of the character area. Thereby, even when the image appears blurred or the color appears bleeding due to image compression or the like, the luminous values in the character area can be flexibly eliminated from the luminous histogram. The margin of ±4 given to each of the luminous value and the color-difference values is merely an example. Further, the margins of the luminous value and the color-difference values may be stored in the specified pixel information storage unit 102.

(Step S103)

When it is judged by the count judgement unit 103 that the luminous value and the color-difference values of the target pixel match the luminous value and the color-difference values stored in the specified pixel information storage unit 102 and the target pixel is a component of the character area, the data relating to the target pixel is discarded to prevent the data of the pixel that is a component of the character area from adversely affecting the image-quality correction, and the luminous value relating to the target pixel is not output to the luminous histogram formation unit 104.

(Step S104)

On the other hand, when it is judged that the luminous value and color-difference values of the target pixel do not match the luminous value and the color-difference values stored in the specified pixel information storage unit 102 and the target pixel is not a component of the character area, the luminous value relating to the target pixel is output from the count judgement unit 103 to the luminous histogram formation unit 104.

(Step S105)

In the luminous histogram formation unit 104, a luminous histogram indicating the total sum of pixels having the same luminous value is formed using the luminous value of the target pixel that is not a component of the character area, which is output from the count judgement unit 103. Thereby, a luminous histogram of only the image area which corresponds to the input image excluding the character area is formed.

(Step S106)

The luminous histogram formed in the luminous histogram formation unit 104 is input to the correction amount calculation unit 105, and the correction amount calculation unit 105 calculates the amount of correction using the inputted luminous histogram. In this first embodiment, the correction amount calculation unit 105 forms a correction curve, and the image quality correction unit 106 to be described later performs correction of image quality using the correction curve.

The correction curve is formed as follows. That is, initially, the frequencies of the respective luminous values are successively accumulated from the lowermost luminous value of the luminous histogram to obtain cumulative luminous distribution, and then normalization is carried out so that the frequency of the cumulative luminous distribution becomes 0~255. Then, a curve having the frequency of the cumulative luminous distribution that is normalized to 0~255 on the vertical axis and the luminous value on the horizontal axis is formed to obtain a correction curve.

(Step S107)

Finally, the image quality correction unit 106 performs correction of image quality of the input image using the amount of correction that is calculated by the correction amount calculation unit 105. In this first embodiment, the image quality correction unit 106 receives the correction curve formed by the correction amount calculation unit 105, and performs correction of image quality of the input image by converting the input image data R, G, and B, using the correction curve with the horizontal axis being input data and the vertical axis being output data, commonly for R, G, and B. Thereby, it is possible to obtain an output image that is corrected over the whole gradations with favorable color balance.

While in steps S106 and S107 correction of image quality using the correction curve is described, there are proposed various kinds of methods for correcting the image quality of an input image using a luminous histogram, and therefore, the present invention is not restricted to the method that is mentioned for this first embodiment.

As described above, in the image quality correction apparatus according to the first embodiment, a luminous histogram comprising only an image area other than a character area is formed from input image data, and correction of image quality is carried out using the luminous histogram, whereby correction of image quality that is not adversely affected by characters mixed into the image can be carried out.

Next, correction of image quality by the image quality correction apparatus according to the first embodiment will be described with reference to FIGS. 3 to 5.

Figure 3:
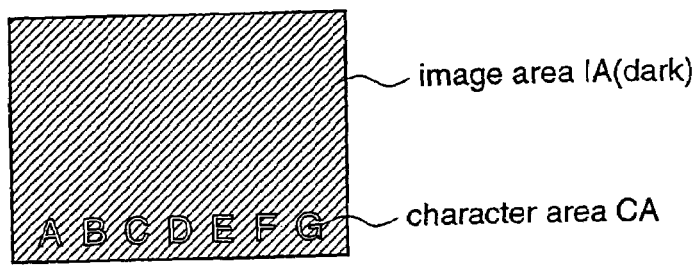
FIG. 3 shows an image into which characters are mixed.
Figure 4:
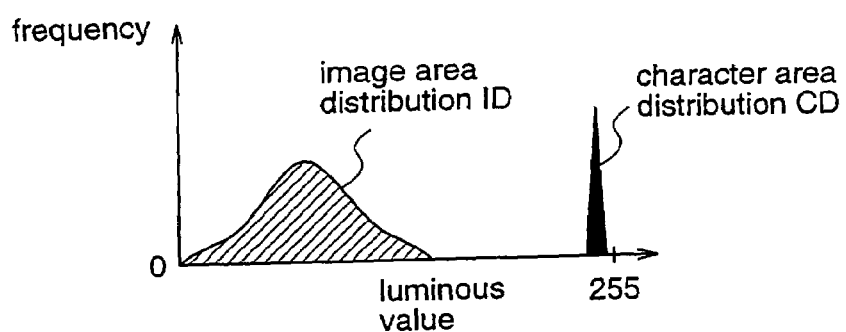
FIG. 4 is a diagram illustrating a luminous histogram of the image shown in FIG. 3.

FIG. 3 is a diagram illustrating an example of an image into which characters are mixed.

This image is dark as a whole, and the color of the characters is white. FIG. 4 is a luminous histogram formed from the whole pixels of the image shown in FIG. 3. Since the image area IA is dark, it is distributed at the lower luminous levels. On the other hand, since the character area CA including the characters is white, it is distributed at the higher luminous levels.

When such image data is inputted, the dark image must be corrected to be bright. However, with reference to the luminous histogram shown in FIG. 4, the distribution of the image area ID exists at the lower-luminous side while the distribution of the character area CD exists at the higher-luminous side, and therefore, it is difficult to judge, from only the luminous histogram, that the input image data is dark image data, whereby appropriate correction of image quality cannot be carried out.

In order to solve the above-mentioned problem, in the image quality correction apparatus according to the present invention, the luminous information and the color-difference information relating to the pixels in the character area which makes an outstanding peak when forming a histogram are previously stored in the specified pixel information storage unit 102, and the count judgement unit 103 judges whether a target pixel of the input image data is a component of the character area or not, and the luminous histogram formation unit 104 forms a luminous histogram using only the pixels in the image area.

Figure 5:
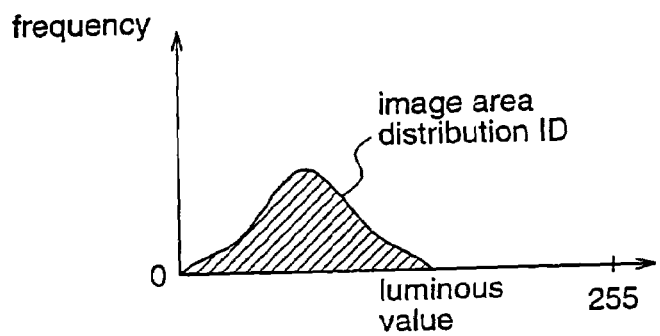
FIG. 5 is a diagram illustrating a luminous histogram which is formed by only pixels in an image area from the image shown in FIG. 3.

FIG. 5 illustrates a luminous histogram that is formed by only the pixels in the image area of the image shown in FIG. 3. When performing correction of image quality on the basis of the luminous histogram, it can be found that the image area is distributed at the lower-luminous levels, whereby correction for brightening the image can be carried out.

As described above, in the image quality correction apparatus and method according to the present invention, when forming a luminous histogram from a digital image, initially, it is judged whether a target pixel is a component of a character area or not. Then, a luminous histogram comprising only luminous values of pixels other than those of the character area is formed, and the image quality of the input image is corrected on the basis of the luminous histogram. Therefore, even when a character area exists in an input image, the input image can be appropriately corrected without being affected by the character area.

While in this first embodiment the luminous values and the color-difference values have previously been stored as pixel information in the specified pixel information storage unit 102, the present invention is not restricted thereto. For example, the values of R, G, and B may be set as pixel information, and the luminous values and color-difference values may be calculated using formulae (1)~(3) to be compared with the luminous values and color-difference values of the target pixel that is outputted from the luminous color-difference calculation unit 101.

Further, while in this first embodiment the number of specified colors which are previously stored in the specified pixel information storage unit 102 is not particularly described, not only one but also plural specified colors may be stored. When plural specified colors are stored in the specified pixel information storage unit 102, even if plural character areas having luminous values and color-difference values exist in the input image, it is possible to discriminate the plural character areas from each other. Further, a plurality of image information which are frequently used may be previously stored. In this case, updation of image information for every input image becomes unnecessary, whereby time and effort for resetting the image information is saved.

While in this first embodiment a dark image is corrected, the present invention is not restricted thereto. That is, the present invention is not restricted to the case where a character area exists in a dark image, but it is also applicable to the case where a character area exists in a bright image. Also in this case, correction of image quality can be carried out as described above.

Embodiment 2

Hereinafter, an image quality correction apparatus and an image quality correction method according to a second embodiment of the present invention will be described with reference to the drawings.

The image quality correction apparatus and method according to the second embodiment are different from those of the first embodiment in that, when there is a projecting gradation level (hereinafter referred to as projecting level) in a luminous histogram that is formed from input image data, a luminous value and color-difference values to be used for judging as to whether a target pixel is a component of a character area or not is obtained from a luminous value having the detected level.

Figure 6:
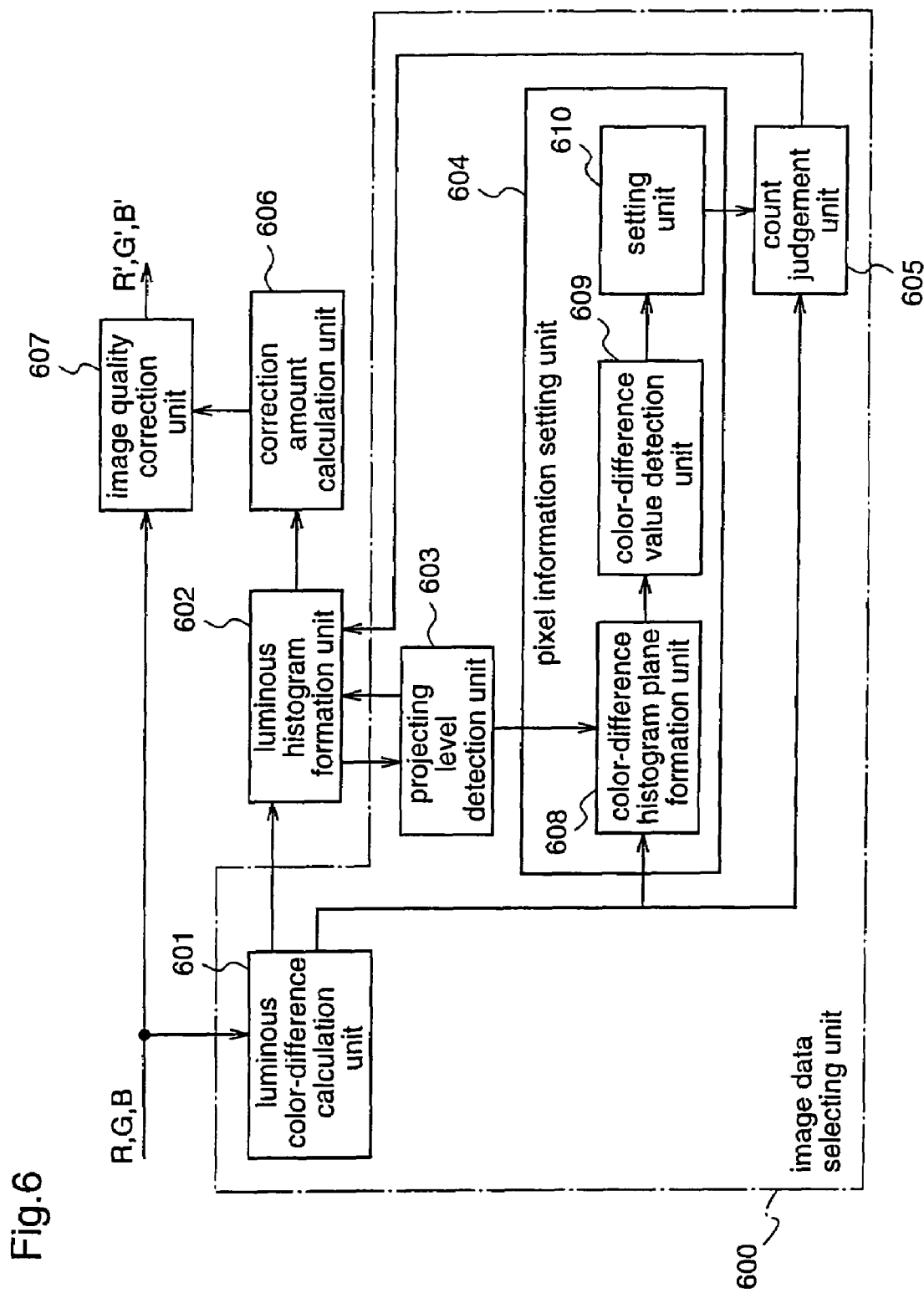
FIG. 6 is a block diagram illustrating an example of an image quality correction apparatus according to a second embodiment of the present invention.

FIG. 6 is a block diagram illustrating an example of an image quality correction apparatus according to the second embodiment.

As shown in FIG. 6, the image quality correction apparatus according to the second embodiment is provided with a luminous color-difference calculation unit 601, a luminous histogram formation unit 602, a projecting level detection unit 603, a pixel information setting unit 604, a count judgement unit 605, a correction amount calculation unit 606, and an image quality correction unit 607.

The luminous color-difference calculation unit 601 calculates luminous values and color-difference values from input image data R, G, and B, and outputs the calculated luminous values and color-difference values to the luminous histogram formation unit 602, the pixel information setting unit 604, and the count judgement unit 605.

On receipt of the luminous values outputted from the luminous color-difference calculation unit 601, the luminous histogram formation unit 602 forms a luminous histogram using the luminous values, and outputs the luminous histogram to the projecting level detection unit 603. Further, on receipt of the luminous values outputted from the count judgement unit 605, the luminous histogram formation unit 602 forms a luminous histogram using the luminous values, and outputs the luminous histogram to the correction amount calculation unit 606.

The projecting level detection unit 603 receives, from the luminous histogram formation unit 602, the luminous histogram that is formed on the basis of the luminous values outputted from the luminous color-difference calculation unit 601, and detects a peak-shaped projecting level in the luminous histogram, and outputs it to the pixel information setting unit 604.

The pixel information setting unit 604 detects color-difference values the frequencies of which are equal to or higher than a predetermined threshold value, from among the color-difference values of pixels having the luminous value of the projecting level detected by the projecting level detection unit 603, and sets the detected color-difference values and the luminous value of the projecting level, as pixel information of pixels constituting a character area.

An image data selecting unit 600 comprises the luminous color-difference calculation unit 601, the projecting level detection unit 603, the pixel information setting unit 604, and the count judgement unit 605. When pixel data in the character area is included as degradation factor data that causes degradation in image quality when performing correction of image quality of the input image data, the image data selecting unit 600 performs data selection to remove the pixel data in the character area from the input image data.

The count judgement unit 605 judges whether the luminous value and the color-difference values which are set by the pixel information setting unit 604 match the luminous value and the color-difference values of the target pixel which is output from the luminous color-difference calculation unit 601. When there is a match, the count judgement unit 605 judges that the target pixel is a component of the character area, and discards the data of the target pixel. On the other hand, when there is no match, the count judgement unit 605 judges that the target pixel is not a component of the character area, and outputs the luminous value of the target pixel to the luminous histogram formation unit 602.

The correction amount calculation unit 606 calculates the amount of correction by using the luminous histogram that is formed without the pixel data corresponding to the projecting level, i.e., the luminous histogram that is formed on the basis of the luminous values outputted from the count judgement unit 605, among the two luminous histograms formed by the luminous histogram formation unit 602, and then outputs the amount of correction to the image quality correction unit 607.

The image quality correction unit 607 corrects the input image data R, G, and B on the basis of the amount of correction calculated by the correction amount calculation unit 606 to obtain image output data R', G', and B'.

Next, the construction of the pixel information setting unit 604 will be described in more detail.

The pixel information setting unit 604 comprises a color-difference histogram plane formation unit 608, a color-difference value detection unit 609, and a setting unit 610.

The color-difference histogram plane formation unit 608 forms a color-difference histogram plane that expresses distribution and frequencies of color-difference values, from the color-difference values of the pixels having the luminous value of the projecting level that is detected by the projecting level detection unit 603.

The color-difference value detection unit 609 detects the color-difference values whose frequencies are equal to or higher than a predetermined threshold value, from the color-difference histogram plane that is formed by the color-difference histogram plane formation unit 608.

The setting unit 610 sets the luminous value of the projecting level that is detected by the projecting level detection unit 603 and the color-difference values detected by the color-difference value detection unit 609, as pixel information of pixels constituting the character area.

Next, the operation of the image quality correction apparatus according to the second embodiment of the present invention will be described.

Figure 7:
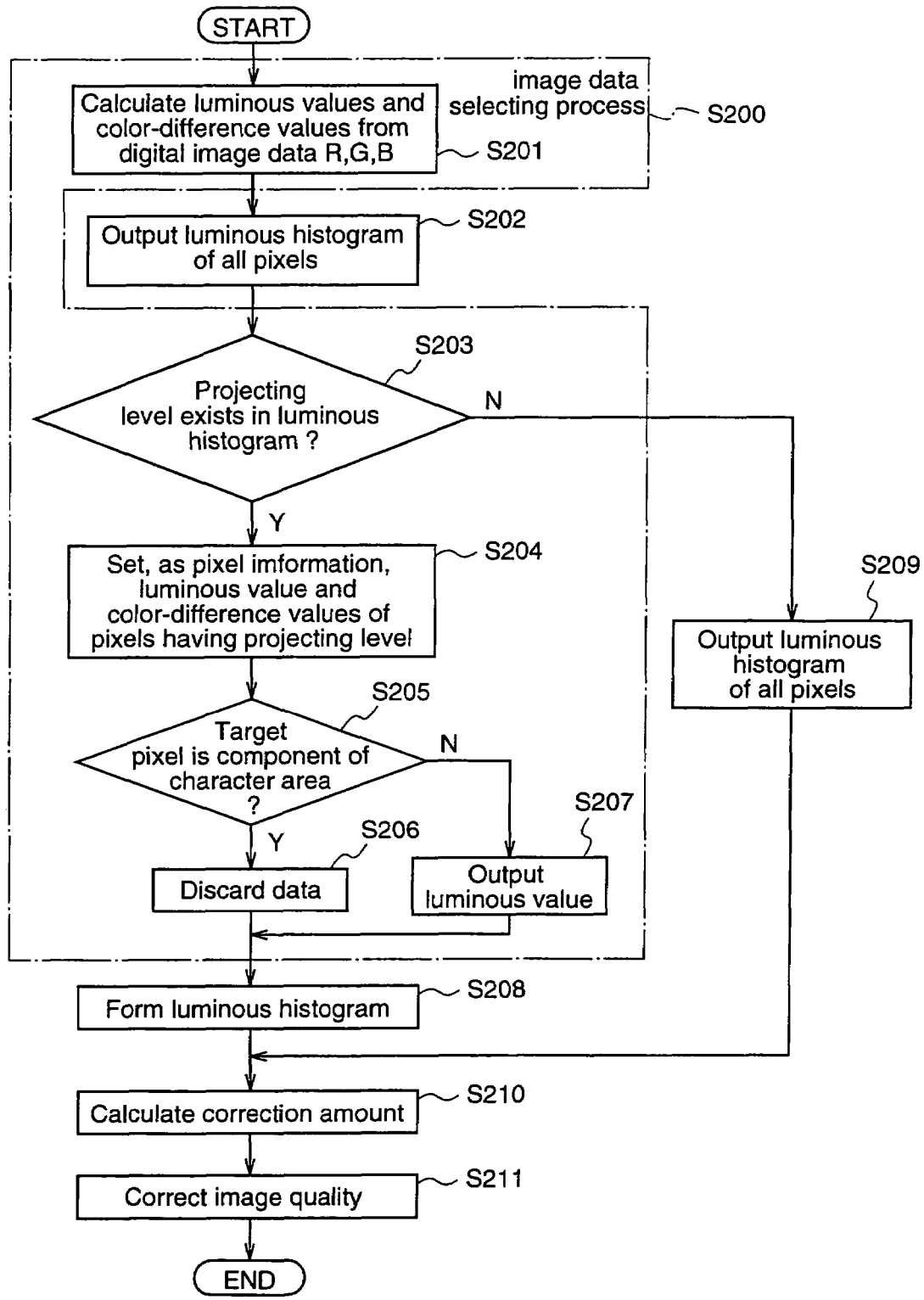
FIG. 7 is a flowchart for explaining an image quality correction method to be performed by the image quality correction apparatus according to the second embodiment.

FIG. 7 is a flowchart for explaining the process steps of the image quality correction method to be performed by the image quality correction apparatus according to the second embodiment.

It is assumed that each of the input image data R, G, and B is composed of eight bits, although the number of bits is not restricted thereto.

The flowchart shown in FIG. 7 comprises steps S201~S211. To be specific, step S201 constitutes a luminous color-difference calculation process, step S203 constitutes a projecting level detection process, step S204 constitutes an image information setting process, steps S205, S206, and S207 constitute a count judgement process, step S200 constitutes an image data selecting process comprising steps S201 and S203 to S207, steps S208, S202, and S209 constitute a luminous histogram formation process, step S210 constitutes a correction amount calculation process, and step S211 constitutes an image quality correction process.

(Step S201)

When digital image data R, G, and B are input to the image quality correction apparatus according to the present invention, initially the luminous color-difference calculation unit 601 calculates luminous values and color-difference values from the input image data R, G, and B, and outputs the values to the luminous histogram formation unit 602, the pixel information setting unit 604, and the count judgement unit 605. Since the method for calculating a luminous value Y and color-difference values Cr and Cb are identical to that described for step S101 shown in FIG. 2, repeated description is not necessary.

(Step S202)

The luminous histogram formation unit 602 forms a luminous histogram indicating the total sum of pixels having the same luminous values, using the luminous values of all pixels of the input image, which are calculated by the luminous color-difference calculation unit 601, and outputs the luminous histogram to the projecting level detection unit 603.

(Step S203)

The luminous histogram corresponding to all pixels, which is formed by the luminous histogram formation unit 602, is input to the projecting level detection unit 603, and the projecting level detection unit 603 detects a projecting level in the luminous histogram.

Figure 8:
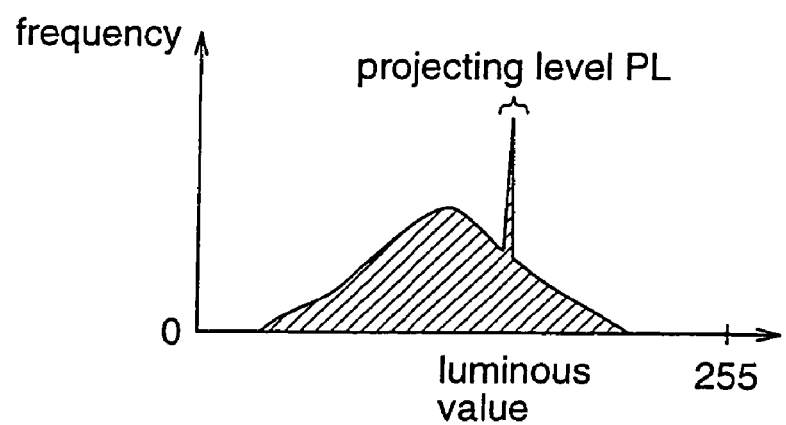
FIG. 8 is a luminous histogram of all pixels which is formed for an image including characters.

FIG. 8 shows an all-pixel luminous histogram that is formed for an image into which characters are mixed. Since the characters that appear as an outstanding shape when forming a luminous histogram have the same color, the luminous value of the character area is concentrated and appears as a peak-shaped level that protrudes over the neighboring levels. Accordingly, when the all-pixel luminous histogram is searched for the projecting level PL, it can be judged whether characters are mixed into the image or not. Further, when characters that appear as a peak shape in the luminous histogram are mixed into the image, the luminous value of the characters can be obtained.

As a concrete method for detecting the projecting level by the projecting level detection unit 603, the degree of increase of the noticed level with respect to the adjacent levels may be detected. More specifically, the frequencies are successively checked from the lowest luminous side of the all-pixel luminous histogram, and a gradation level having a change equal to or higher than a predetermined threshold value as compared with the frequencies of the adjacent levels is detected as a projecting level. At this time, the predetermined threshold value to be used for judging whether a projecting level exists or not may be obtained by formula (4) as follows.

$$T = k \times H/256 \qquad (4)$$

wherein T is a constant amount, H is the total number of pixels, and k is a factor to be adjusted according to the size of the character area. In this second embodiment, it is assumed that k is 0.1.

When a projecting level is detected by the projecting level detection unit 603, the processing goes to step S204. Otherwise, the processing goes to step S209.

(Step S204)

When a projecting level is detected by the projecting level detection unit 603, the pixel information setting unit 604 detects the color-difference values of the pixels constituting the character area, from the color-difference values of pixels having the luminous value of the projecting level that is detected by the projecting level detection unit 603, and sets the detected color-difference values and the luminous value of the projecting level as pixel information of pixels constituting the character area. That is, since the characters are generally of the same color as described above, the color-difference values are also concentrated. Therefore, the color whose color-difference values appear frequently in the pixels having the luminous value of the projecting level is detected as the color-difference values of pixels constituting the character area to be set as pixel information of pixels constituting the character area.

Figure 9:
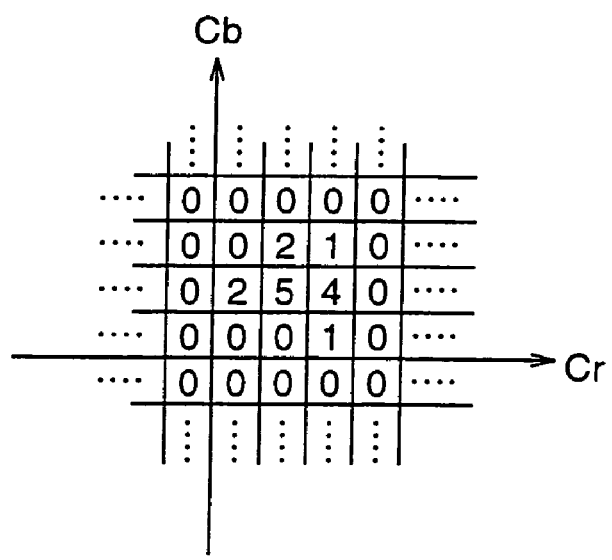
FIG. 9 is a color-difference histogram plane expressing distribution and frequencies of color-difference values.

To be specific, initially, the color-difference histogram plane formation unit 608 forms a color-difference histogram plane indicating the distribution and frequency of color-difference values as shown in FIG. 9, from the color-difference values of pixels having the luminous value of the projecting level that is detected by the projecting level detection unit 603. In FIG. 9, the abscissa shows the Cr values while the ordinate shows the Cb values, and the frequencies at the coordinate positions of the respective values are plotted.

Then, the color-difference value detection unit 609 detects the color-difference values whose frequencies are equal to or higher than a predetermined threshold value, from the color-difference histogram plane that is formed by the color-difference histogram plane formation unit 608, and the setting unit 610 sets the luminous value of the projecting level that is detected by the projecting level detection unit 603 and the color-difference values that is detected by the color-difference value detection unit 609, as pixel information of pixels constituting the character area.

The predetermined threshold value employed by the color-difference value detection unit 609 may be obtained by formula (5) as follows.

$$Th = kh \times Hh \qquad (5)$$

wherein Th is the threshold value, Hh is the total number of pixels of the projecting level, and kh is the coefficient whose value is adjustable according to the size of the character area. It is assumed that kh is 0.2 in this second embodiment.

(Step S205)

The count judgement unit 605 compares the luminous value and color-difference values which are set by the pixel information setting unit 604 with the luminous value and color-difference values of the target pixel which are outputted from the luminous color-difference calculation unit 601, and judges whether or not the target pixel outputted from the luminous color-difference calculation unit 601 is a component of the character area.

(Step S206)

When it is judged by the count judgement unit 605 that the luminance value and color-difference values of the target pixel match the luminous value and color-difference values set by the pixel information setting unit 604 and therefore the target pixel is a component of the character area, the data relating to the target pixel is discarded to prevent the data of the pixels constituting the character area from adversely affecting correction of image quality, whereby the luminous value relating to the target pixel is not output from the count judgement unit 605 to the luminous histogram formation unit 602.

(Step S207)

On the other hand, when the luminous value and color-difference values of the target pixel do not match the luminous value and color-difference values which are set by the pixel information setting unit 604 and therefore the target pixel is judged as being not a component of the character area, the luminous value of the target pixel is output from the count judgement unit 605 to the luminous histogram formation unit 602.

(Step S208)

The luminous histogram formation unit 602 forms a luminous histogram indicating the total sum of pixels having the same luminous value, using the luminous values of pixels which are not the components of the character area and are output from the count judgement unit 605. Thereafter, the luminous histogram formation unit 602 outputs the luminous histogram to the correction amount calculation unit 606.

(Step S209)

On the other hand, when no projecting level is detected by the projecting level detection unit 603 in step S203, it is judged that the input image includes no pixels constituting a character area. Therefore, the all-pixel luminous histogram formed by the luminous histogram formation unit 602 is output to the correction amount calculation unit 606 as a luminous histogram corresponding to only the image area having no character area.

(Step S210)

The correction amount calculation unit 606 calculates the amount of correction using the inputted luminous histogram. Since the method for calculating the amount of correction by the correction amount calculation unit 606 is identical to that described for step S106 shown in FIG. 2, repeated description is not necessary.

(Step S211)

Finally, the image quality correction unit 607 corrects the input image data using the amount of correction that is calculated by the correction amount calculation unit 606. Since the correction method is identical to that described for step S107 shown in FIG. 2, repeated description is not necessary.

As described above, in the image quality correction apparatus and the image quality correction method according to the second embodiment of the present invention, a luminous histogram relating to all pixels is formed with respect to inputted image data. When there is a projecting level in the luminous histogram, a luminous value and color-difference values to be judged as pixels constituting a character area are obtained from the luminous value having the detected level, thereby automatically specifying the pixels constituting the character area which is mixed into the image. Then, a luminous histogram relating to only an image area excluding the character area is formed, and correction of image quality is carried out using the luminous histogram. Therefore, even when a character area exists in the input image, appropriate correction can be performed on the input image without being affected by the character area.

Figure 10:
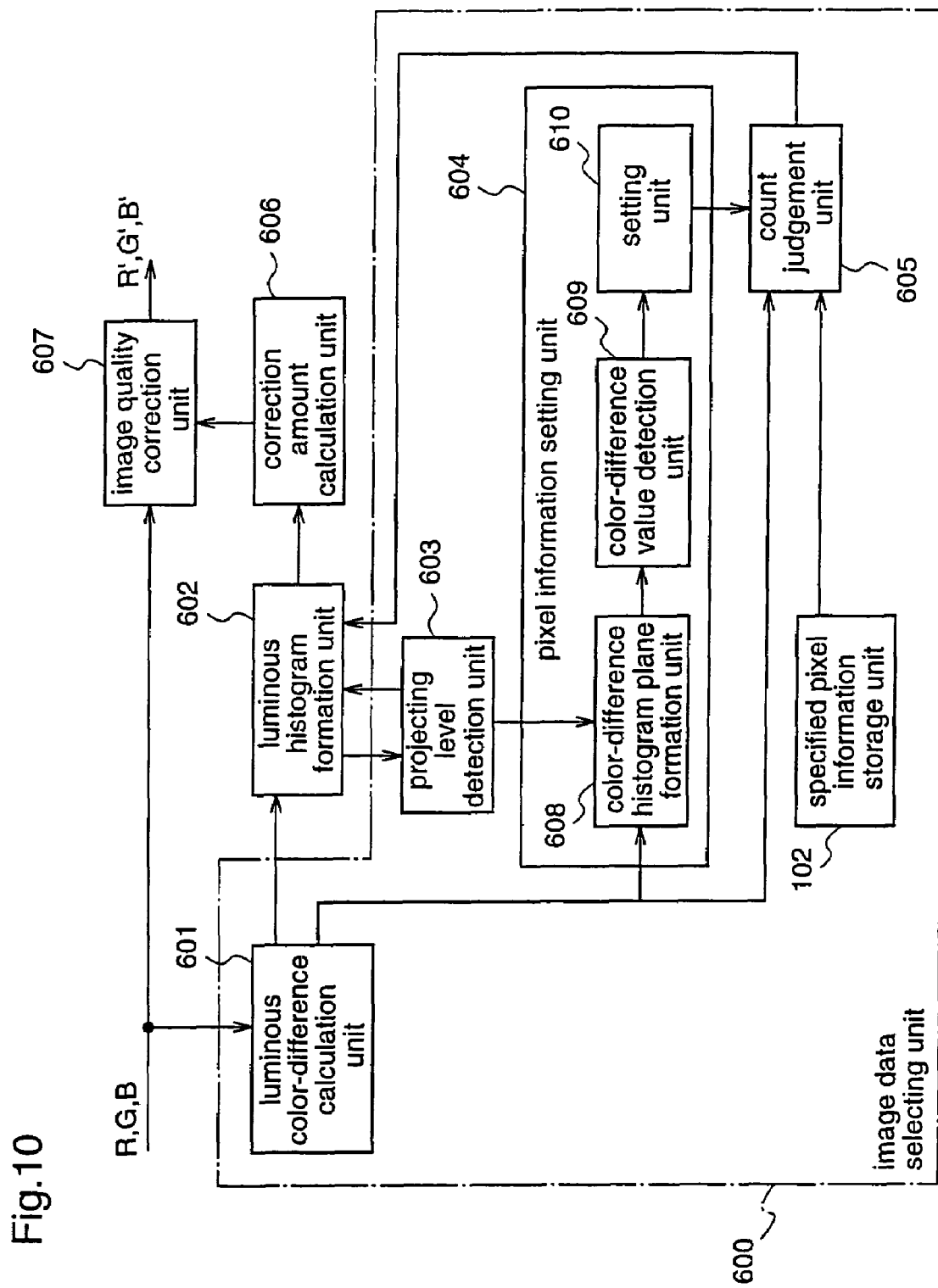
FIG. 10 is a block diagram illustrating a modification of the image quality correction apparatus according to the second embodiment of the present invention.

Further, as shown in FIG. 10, the image quality correction apparatus according to the second embodiment may be provided with the specified pixel information storage unit 102 according to the first embodiment. In this case, when the luminous values and color-difference values of pixels constituting a character area have previously been known, these values may be stored in the specified pixel information storage unit 102, and the count judgement unit 605 may judge whether the target pixel is a component of the character area or not, on the basis of the luminous values and color-difference values which are set in the pixel information setting unit 604 and the luminous value and color-difference values which are stored in the specified pixel information storage unit 102. Therefore, at least the pixels which have already been recognized as pixels constituting the character area are judged as pixels constituting the character area by the count judgement unit 605, thereby preventing degradation in accuracy of image quality correction, which is caused by leakage of setting for pixels constituting the character area by the pixel information setting unit 604.

Embodiment 3

Next, a modification of the processing by the pixel information setting unit 604 according to the second embodiment will be described as a third embodiment of the present invention.

Figure 11:
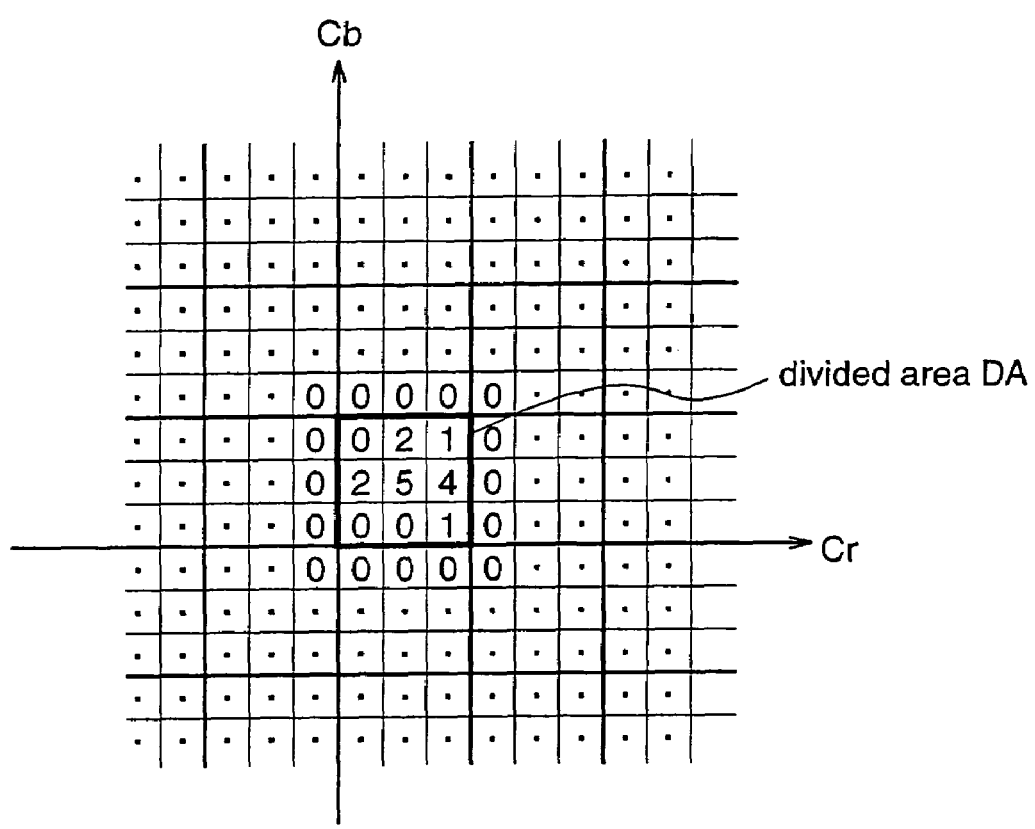
FIG. 11 is a color-difference histogram plane expressing distribution and frequencies of color-difference values, which is divided at predetermined intervals.

With reference to FIG. 11, in the pixel information setting unit 604 according to the third embodiment, the color-difference value detection unit 609 divides the color-difference histogram plane formed by the color-difference histogram plane formation unit 608 at predetermined intervals, and judges whether or not a representative value that is calculated from the frequencies of the color-difference values in each of the divided areas DA is equal to or larger than a predetermined threshold value, and detects the color-difference values in the divided area DA having the representative value equal to or larger than the predetermined threshold value. The intervals at which the color-difference histogram plane is divided may be adjusted according to the size of the character area included in the input image, while it is three in this third embodiment. Further, the representative value may be the frequency of the color-difference value that is positioned in the center of the divided area, or the total sum of the frequencies of the color-difference values in the divided area. Further, since the predetermined threshold value used by the color-difference value detection unit 609 is identical to that described for step S204 shown in FIG. 7, repeated description is not necessary.

As described above, in the image quality correction apparatus and the image quality correction method according to the third embodiment, the color-difference value detection unit in the pixel information setting unit divides the color-difference histogram plane formed by the color-difference histogram plane formation unit at predetermined intervals, and judges whether or not a representative value that is calculated from the frequencies of color-difference values in each divided area is equal to or larger than a predetermined threshold value, thereby detecting the color-difference values in an area having the representative value equal to or larger than the predetermined threshold value. Therefore, even when the image appears blurred or the color of the image appears bleeding due to image compression or the like, the color-difference values of the character area can be flexibly calculated.

Embodiment 4

Next, a description will be given of a process of specifying pixels constituting a character area, which is carried out in parallel with the processing of the pixel information setting unit 604, as a fourth embodiment of the present invention.

Since characters are of the same color as described above, an area corresponding to the characters on a color-difference plane should be narrow. Therefore, when areas having color-difference values whose frequencies are equal to or higher than a predetermined threshold value are continuous on the color-difference histogram plane that is formed by the color-difference histogram plane formation unit 608, the color-difference value detection unit 609 in the pixel information setting unit 604 judges whether or not the ratio of the area of the continuous areas on the color-difference histogram plane to the area of the distribution of all color-difference values is equal to or larger than a predetermined threshold value. When the ratio of the area of the continuous areas is equal to or larger than the predetermined threshold value, the continuous areas are judged as an image area, and the color-difference values in the area are not detected as color-difference values of pixels constituting a character area. The predetermined threshold value used by the color-difference value detection unit 609 may be adjusted according to the size of the character area included in the input image, while it is 5% with respect to the area of the distribution of all color-difference values on the color-difference histogram plane.

As described above, in the image quality correction apparatus and the image quality correction method according to the fourth embodiment of the present invention, the color-difference value detection unit in the pixel information setting unit judges whether or not the ratio of the area of continuous areas on the color-difference histogram plane to the area of the distribution of all color-difference values is equal to or larger than a predetermined threshold value. When the ratio of the area of the continuous areas is equal to or larger than the threshold value, the color-difference values in the corresponding area are not detected as color-difference values of pixels constituting a character area. Therefore, an image of a uniform color having gradations such as an image of sky is prevented from being erroneously detected as pixels constituting a character area, thereby enhancing the accuracy in setting the pixels constituting the character area by the pixel information setting unit.

Embodiment 5

Next, a description will be given of a process for specifying pixels constituting a character area, which is performed by the pixel information setting unit 604 according to the second embodiment, as a fifth embodiment of the present invention.

In this fifth embodiment, only pixels whose luminous values and color difference values are apart by a predetermined threshold value from predetermined reference values are set as pixels constituting a character area, in addition to the method of setting pixels constituting a character area by the pixel information setting unit 604 according to the second embodiment.

There are many cases where a color of a character is different from that of an image area displayed on a screen to clearly distinguish the character from the image. Generally, a pixel as a component of the character is given a luminous value and color-difference values as well as a color that is far different from the center levels of the luminous value and color-difference values. Since each of input image data R, G, and B has 8 bits, there are many cases where a color of maximum or minimum luminance level such as pure white ((R, G, B)=(255, 255, 255)) or pure black ((R, G, B)=(0, 0, 0)), or a color having a high chroma such as pure red ((R, G, B)=(255, 0, 0)) or pure blue ((R, G, B)=(0, 0, 255)) are set as information of pixels constituting the character area.

Therefore, the setting unit 610 of the pixel information setting unit 604 judges whether or not the luminous value of the projecting level that is detected by the projecting level detection unit 603 or the color-difference values detected by the color-difference value detection unit 609 are apart by a predetermined threshold value or more from predetermined reference values provided for the luminous value and the color-difference values, respectively. Only when either the luminous value or the color-difference values is apart by the threshold value or more from the reference value, the setting unit 610 sets the corresponding luminous value and color-difference values as pixel information of pixels constituting the character area.

Figure 12:
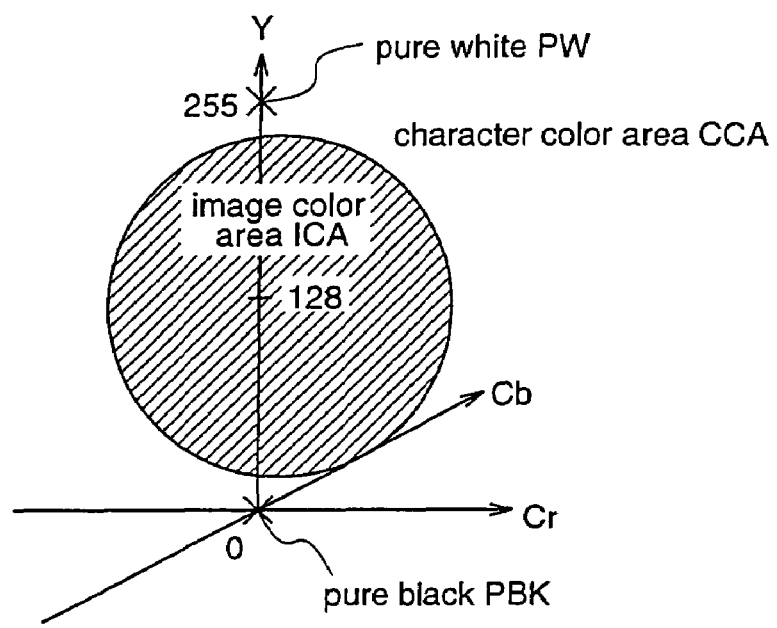
FIG. 12 is a Y color-difference space diagram illustrating a color area used by characters.
Figure 13:
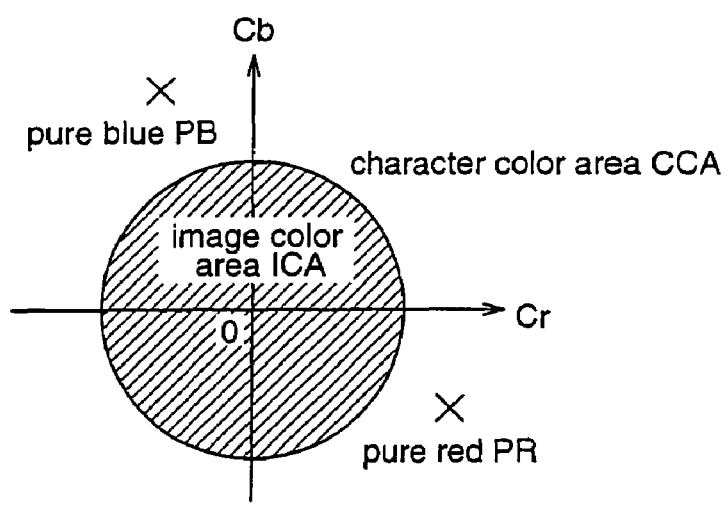
FIG. 13 a color-difference space diagram illustrating a color area used by characters.

That is, in the setting unit 610 of the pixel information setting unit 604, the predetermined reference values corresponding to the luminous value and the color-difference values are used as center levels of the luminous value and the color-difference values, respectively, and the luminous value and the color-difference values of the corresponding pixel data are set as pixels constituting the character area when the condition of formula (6) or formula (7) as follows is satisfied. When each of the input image data R, G, and B has 8 bits, the predetermined reference value of the luminous value is indicated as Y=128, and the reference values of the color-difference values are indicated as Cr=0 and Cb=0. Further, Th1 and Th2 are threshold values for judging whether the luminous value Y and the color-difference values Cr and Cb are apart from the predetermined reference values by the threshold values or not. In this fifth embodiment, Th1=110, and Th2=150. With reference to FIGS. 12 and 13, the outside of an image color area ICA is a character color area CCA. Further, the coordinates PW, PBK, PB, and PR represent pure white, pure black, pure blue, and pure red, respectively.

$$|Y-128| \geq Th1 \quad (6)$$

$$\sqrt{Cr^2 + Cb^2} \geq Th2 \quad (7)$$

As described above, in the image quality correction apparatus and the image quality correction method according to the fifth embodiment of the present invention, the setting unit 610 of the pixel information setting unit 604 judges whether either of the luminous value and the color-difference values of the target pixel is apart from the predetermined reference values of the luminous value and the color-difference values, and only when either the luminous value or the color-difference values is apart from the predetermined reference values by the threshold value or more, the luminous value and the color-difference values are set as pixel information of pixels constituting the character area. Therefore, the pixels that do not constitute the character area are prevented from being detected by mistake, resulting in an increase in accuracy of setting the pixels constituting the character area by the pixel information setting unit.

While in this fifth embodiment the process of specifying the pixels that constitute the character area by the setting unit 610 of the pixel information setting unit 604 is carried out in parallel with the processing of the pixel information setting unit 604 according to the second embodiment, it may be carried out in parallel with the processing of the pixel information setting unit 604 according to the third or fourth embodiment.

Embodiment 6

Hereinafter, an image quality correction apparatus and an image quality correction method according to a sixth embodiment of the present invention will be described with reference to the drawings. In the image quality correction apparatus and method according to the sixth embodiment, when the total frequency of a luminous histogram formed from input image data by the luminous histogram formation unit 602 is equal to or lower than a predetermined value, correction of image quality of input image data is not carried out.

Figure 14:
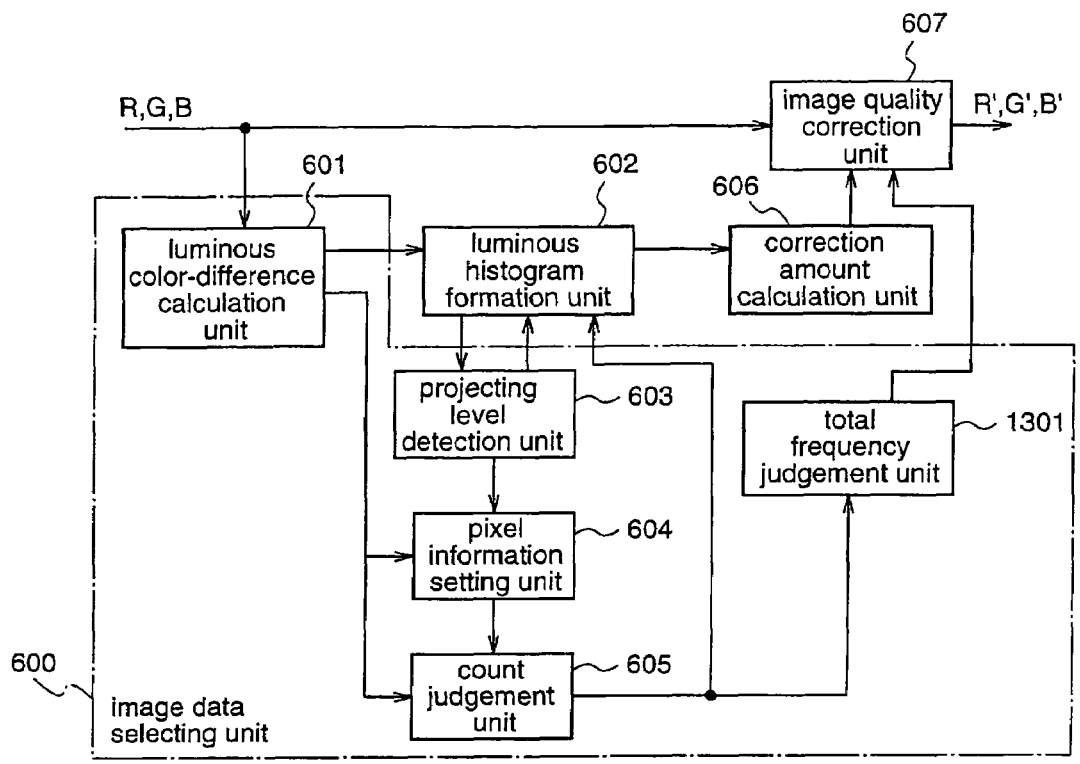
FIG. 14 is a block diagram illustrating an example of an image quality correction apparatus according to a sixth embodiment of the present invention.
Figure 15:
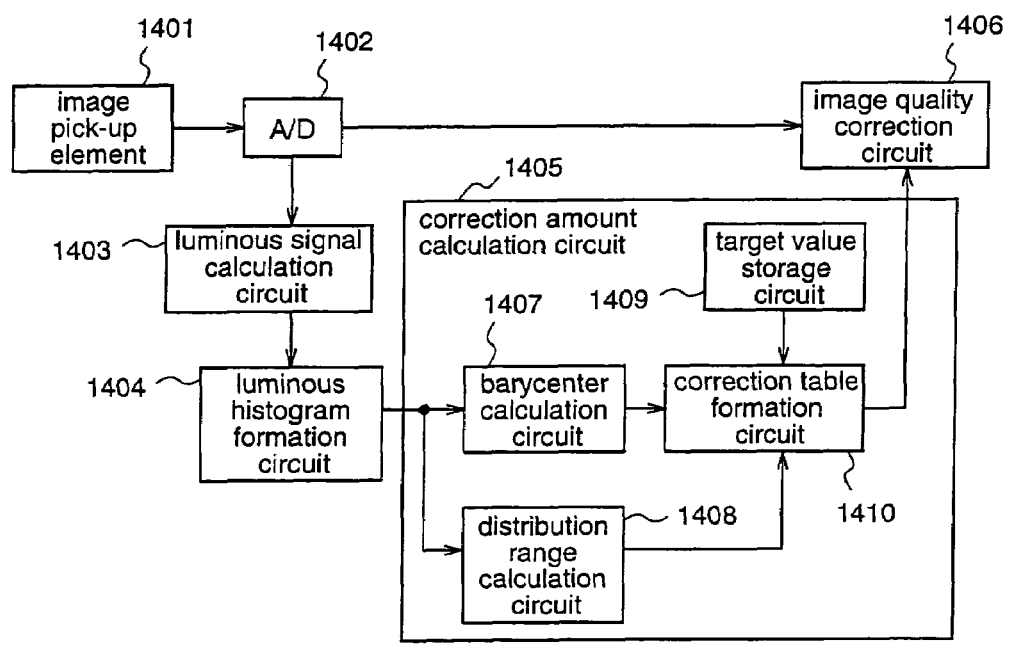
FIG. 15 is a block diagram illustrating the conventional image quality correction apparatus.

FIG. 14 is a block diagram illustrating the construction of an image quality correction apparatus according to the sixth embodiment.

With reference to FIG. 14, the image quality correction apparatus according to the sixth embodiment is provided with a luminous color-difference calculation unit 601, a luminous histogram formation unit 602, a projecting level detection unit 603, a pixel information setting unit 604, a count judgement unit 605, a correction amount calculation unit 606, an image quality correction unit 607, and a total frequency judgement unit 1301. The same reference numerals as those given to the components of the image quality correction apparatus according to the second embodiment denote the same or corresponding components.

Generally, when an input image is such as an illustration in which only a few colors are used, it is not necessary to correct the image quality of the input image. On the contrary, correction might degrade the image quality.

In the sixth embodiment of the present invention, the image quality correction apparatus according to the second embodiment is further provided with the total frequency judgement unit 1301, and correction of image quality of input image data is not carried out when the rate of the number of pixels having the luminous value outputted from the count judgement unit 605 is equal to or lower than a predetermined threshold value.

To be specific, the total frequency judgement unit 1301 counts the number of pixels having the luminous value outputted from the count judgement unit 605. When the ratio of the number of pixels to the total number of pixels of the input image data is equal to or lower than a predetermined threshold value, the judgement unit 1301 judges that the input image data is an image of illustration or the like in which only a few colors are used, and outputs a signal indicating that correction of the input image is not necessary to the image quality correction unit 607 so that the input image is not corrected by the image quality correction unit 607. The predetermined threshold value used by the total frequency judgement unit 1301 is adjustable according to the size of the character area included in the input image. In this sixth embodiment, it is assumed that the ratio of the number of pixels outputted from the count judgement unit 605 to the total number of pixels is 80%.

As described above, in the image quality correction apparatus and method according to the sixth embodiment, the total frequency judgement unit 1301 counts the number of pixels having the luminous value outputted from the count judgement unit 605, and judges whether or not the ratio of the number of counted pixels to the total number of pixels of the input image data is equal to or lower than a threshold value, and correction of image quality of the corresponding image is not carried out when the ratio of the number of counted pixels is equal to or lower than the threshold value. Thereby, the image quality correction apparatus is prevented from performing correction of image quality of an input image which does not need correction, such as an illustration in which only a few colors are used.

While in this sixth embodiment a signal indicating that correction of input image should not be carried out is output to the image quality correction unit 607, the signal may be output to the correction amount calculation unit 606 to set the correction curve linearly so as not to carry out correction.

Further, while in this sixth embodiment the total frequency judgement unit is added to the image quality correction apparatus according to the second embodiment, the total frequency judgement unit may be added to the image quality correction apparatus according to the first embodiment with the same effect as described above.

Further, while in the respective embodiments of the present invention an area of data constituting a character or the like included in an input image is described as a character area, pixel information to be set as pixel information of a character area by the specified pixel information storage unit 102 may be any information so long as it is information of a data area that appears as an outstanding shape when forming a luminous histogram. For example, black-band pixel information which appears in upper and lower portions or left and right portions of an image according to the screen size may be set. Thereby, the same effects as those for the character area can be achieved against a similar problem that occurs in the black band.

While in the respective embodiments of the present invention the image quality correction apparatus is implemented by hardware, image quality correction may be carried out by executing, with a computer or the like, the image quality correction method corresponding to the block diagram or the processing of the flowchart.

Further, a program describing the image quality correction method may be transferred through a communication line or the like, or the image quality correction method may be contained in a program recording medium or the like.

Furthermore, while in the respective embodiments of the invention image quality correction has been described, the present invention is applicable to various kinds of digital signal processing so long as the processing employs a histogram.

In the image quality correction apparatus and method according to the present invention, even when information that adversely affects correction of image quality, such as characters, is mixed into an input image, appropriate correction for the input image can be carried out without being affected by the characters. Therefore, the apparatus and method according to the present invention are applicable to image quality correction processings for various kinds of video equipment, such as a DVD player, having subtitles mixed into image.

What is claimed is:

1. An image quality correction apparatus comprising:
   an image data selecting unit for, when inputted image data (hereinafter referred to as input image data) includes image data which causes degradation in image quality (hereinafter referred to as degradation factor data) when subjecting the input image data to correction of image quality, removing the degradation factor data from the input image data;
   a luminous histogram formation unit for forming a luminous histogram of image data that is outputted from the image data selecting unit;

a correction amount calculation unit for calculating an amount of correction on the basis of the luminous histogram formed by the luminous histogram formation unit; and an image quality correction unit for correcting the input image data on the basis of the amount of correction that is calculated by the correction amount calculation unit;

wherein said degradation factor data are pixel data which constitute a character area and are included in the input image data;

wherein said image data selecting unit comprises:

a luminous color-difference calculation unit for calculating a luminous value and color-difference values for each pixel, from the input image data;

a projecting level detection unit for detecting a locally projecting level from the luminous histogram that is formed using all pixels of the input image data;

a pixel information setting unit for detecting color-difference values whose frequencies are equal to or higher than a predetermined value, from the color-difference values of the pixels having the luminous value of the projecting level which is detected by the projecting level detection unit and setting the detected color-difference values and the luminous value of the projecting level, as pixel information of pixels which constitute the character area; and a count judgement unit for judging whether a target pixel having the luminous value and the color-difference values outputted from the luminous color-difference calculation unit is a component of the character area or not, on the basis of the luminous values and the color-difference values which are obtained from the pixel information that is set by the pixel information setting unit, and outputting the luminous value of the target pixel only when the target pixel is not a component of the character area;

wherein said luminous histogram formation unit forms a luminous histogram using the luminous values of all pixels of the input image data, and a luminous histogram using the luminous values of pixels outputted from the count judgement unit; and wherein said correction amount calculation unit calculates an output of correction on the basis of the luminous histogram that is formed by using the luminous values of pixels outputted from the count judgement unit.

2. An image quality correction apparatus as defined in claim 1, wherein said count judgement unit judges that the target pixel is a component of the character area when the luminous value and the color-difference values which are obtained from the pixel information match the luminous value and the color-difference values of the target pixel which are outputted from the luminous color-difference calculation unit.

3. An image quality correction apparatus as defined in claim 1, wherein said pixel information setting unit comprises:

a color-difference histogram plane formation unit for forming a color-difference histogram plane that shows distribution and frequencies of color-difference values, on the basis of the color-difference values of pixels having the luminous value of the projecting level which is detected by the projecting level detection unit; and a setting unit for setting the luminous value of the projecting level and the color-difference values detected by the color-difference value detection unit, as pixel information of pixels which constitute the character area.

4. An image quality correction apparatus as defined in claim 3, wherein said color-difference value detection unit divides the color-difference histogram plane at predetermined intervals into plural areas, and judges whether or not a representative value that is calculated from the frequencies of color-difference values in each area is equal to or larger than a predetermined threshold value, thereby to detect the color-difference values within the area having the representative value that is equal to or larger than the threshold value.

5. An image quality correction apparatus as defined in claim 3, wherein when areas having color-difference values whose frequencies are equal to or higher than the predetermined threshold value are continuous on the color-difference histogram plane, said color-difference value detection unit judges whether or not the ratio of the area of the continuous areas on the color-difference histogram plane to the whole distribution area of color-difference values is equal to or higher than a predetermined threshold value; and when the ratio is equal to or higher, than the threshold value, said color-difference value detection unit does not detect the color-difference values within the continuous areas, as color-difference values of pixels which constitute the character area.

6. An image quality correction apparatus as defined in claim 3, wherein said setting unit judges whether the luminous value of the projecting level or the color-difference values detected by the color-difference value detection unit is/are apart by a predetermined threshold value or more from predetermined reference values which are set for the luminous value and the color-difference values, respectively, and only when either of the luminous value and the color-difference values is apart from the predetermined reference value, said setting unit sets the luminous value and the color-difference values as pixel information of pixels which constitute the character area.

7. An image quality correction apparatus as defined in claim 1, further including a specified pixel information storage unit for holding the pixel information of the pixels which constitute the character area;

wherein said count judgement unit judges whether the target pixel having the luminous value and the color-difference values outputted from the luminous color-difference calculation unit is a component of the character area or not, on the basis of the luminous values and the color-difference values which are obtained from the pixel information that is set by the pixel information setting unit, and the luminous value and the color-difference values which are obtained from the pixel information stored in the specified pixel information storage unit, and outputs the luminous value of the target pixel only when the target pixel is not a component of the character area.

8. An image quality correction apparatus as defined in claim 1, further including:

a total frequency judgement unit for counting the number of pixels having the luminous values outputted from the count judgement unit, and judging whether or not the ratio of the number of the counted pixels to the total number of pixels of the input image data is equal to or lower than a predetermined threshold value, and performing no correction of image quality for the input image when the ratio is equal to or lower than the predetermined value.

9. An image quality correction method comprising:

an image data selecting step of, when input image data includes degradation factor data which causes degradation in image quality when correcting the image quality of the input image data removing the degradation factor data from the input image data;

a luminous histogram formation step of forming a luminous histogram of image data that is selected in the image data selecting step;

a correction amount calculation step of calculating an amount of correction on the basis of the luminous histogram formed in the luminous histogram formation step; and an image quality correction step of correcting the input image data on the basis of the amount of correction that is calculated in the correction amount calculation step;

wherein said degradation factor data are pixel data which constitute a character area and are included in the input image data;

wherein said image data selecting step comprises:

a luminous color-difference calculation step of calculating a luminous value and color-difference values for each pixel, from the input image data;

a projecting level detection step of detecting a locally projecting level from the luminous histogram that is formed using all pixels of the input image data;

a pixel information setting step of detecting color-difference values whose frequencies are equal to or higher than a predetermined value, from the color-difference values of the pixels having the luminous value of the projecting level which is detected in the projecting level detection step, and setting the detected color-difference values and the luminous value of the projecting level, as pixel information of pixels which constitute the character area; and a count judgement step of judging whether a target pixel having the luminous value and the color-difference values outputted from the luminous color-difference calculation step is a component of the character area or not on the basis of the luminous values and the color-difference values which are obtained from the pixel information set in the pixel information setting step, and outputting the luminous value of the target pixel only when the target pixel is not a component of the character area;

wherein said luminous histogram formation step forms a luminous histogram using the luminous values of all pixels of the input image data, and a luminous histogram using the luminous values of pixels outputted from the count judgement step; and wherein said correction amount calculation step calculates an output of correction on the basis of the luminous histogram that is formed by using the luminous values of pixels outputted from the count judgement step.

* * * * *